Oct. 11, 1927.
H. C. MALLORY
1,644,786
THERMOSTATIC VALVE MECHANISM
Original Filed May 28, 1921
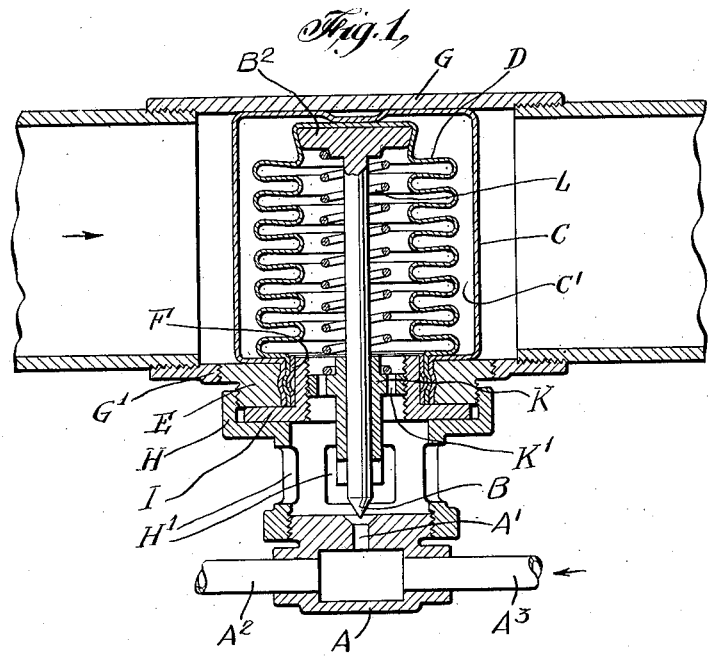
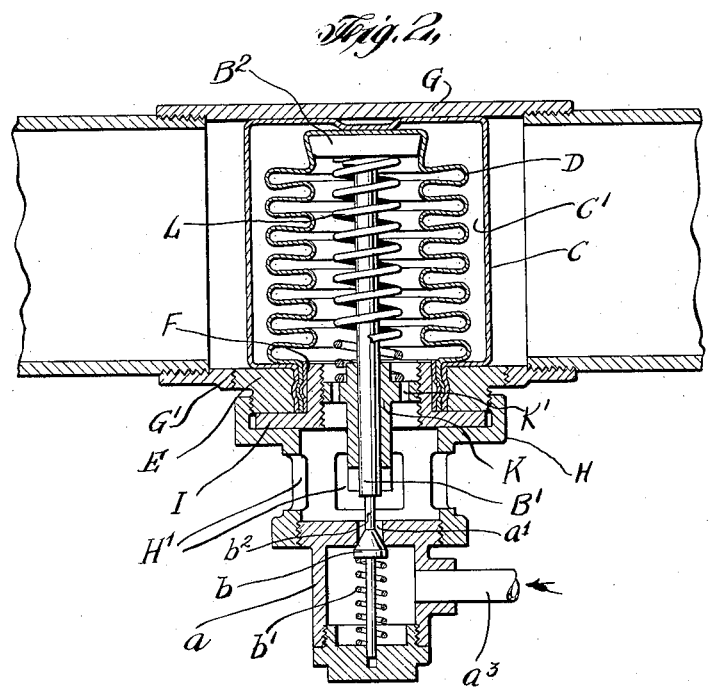
INVENTOR.
Harry C. Mallory Dec.
By Sue H. Mallory Admx.
John E. Hubbell
ATTORNEY Patented Oct. 11, 1927.

1,644,786

UNITED STATES PATENT OFFICE.

HARRY C. MALLORY, DECEASED, LATE OF BELLPORT, NEW YORK, BY SUE R. MALLORY, ADMINISTRATRIX, OF BELLPORT, NEW YORK.

THERMOSTATIC VALVE MECHANISM.

Original application filed May 28, 1921, Serial No. 473,439. Divided and this application filed November 13, 1925. Serial No. 68,830.

The general object of the present invention is to provide an improved thermostatic valve mechanism. More specifically, the object of the invention is to provide a valve mechanism adapted to control fluid flow in one conduit in response to the temperature in another conduit or fluid containing space and characterized by the mechanical simplicity, compactness and reliability of the mechanism.

The various features of novelty which characterize the invention are pointed out with particularity in the claims annexed to and forming a part of this specification. For a better understanding of the invention, however, its advantages and specific objects attained with its use, reference should be had to the accompanying drawings and descriptive matter in which preferred embodiments of the invention are illustrated and described.

Of the drawings:

Fig. 1 is a sectional elevation of one form of valve mechanism; and

Fig. 2 is a sectional elevation of a modified form of mechanism.

In the drawings and referring first to the construction shown in Fig. 1, A represents a valve, the casing of which is provided with a bleeder or vent port A', the flow through which is controlled by a valve member B shown as formed by the conical end of a rod or stem B'. The valve B is actuated by a thermostatic device which includes a container C and an expansible bellows element D mounted in the container with a closed containing space C' between them for a vapor or other thermally expansible fluid. The container C, which is cup-shaped and as shown has a contracted rim or mouth, and the bellows element D which has its inner end closed and may be described as cup-shaped, are mechanically connected at their rims, and the joint between them is sealed by compressing said rim portions in a known manner between an external collar member E and an internal ring F. As shown, the member E, which forms the support for the thermostatic valve mechanism is larger in external diameter than the container C and is externally threaded to permit the member E to be seated in a threaded aperture G' in the wall of a casing or conduit section G containing the fluid acting thermally on the expansible fluid within the space C' and thereby controlling the flow through the port A'.

The casing of the valve A is mechanically connected to, and supported by the member E. The connection shown comprises a tubular part H in threaded engagement at one end with the casing of the valve A and in threaded engagement at its opposite end with the member E. As shown, the member H also holds in place an annular internally threaded member I formed with an out-turned flange clamped between the outer end of the collar E and a suitably shaped portion of the member H. An externally threaded tubular part K in threaded engagement with the member I forms a guide for the stem portion B' of the valve B, and also serves as an adjustable abutment or follower for one end of a compression spring L, the other end of which engages the enlarged head B² at the end of the stem B' remote from the valve B. The head B² of the stem B' bears against the closed end of the bellows element D, and as shown, is mechanically connected thereto by a portion of that element which is spun about the head B². The tension of the spring L, which tends to move the valve B off its seat, may be adjusted by rotating the member K to thereby move the latter axially of the stem B' as a result of the threaded engagement between the members K and I.

The member H is formed with lateral openings H' providing free communication between the external atmosphere and the interior of the valve casing A when the part A' is not closed by the valve member B. The openings H' also permit the member K to be rotated to adjust the tension of the spring L by the fingers of an operator or a suitable instrument inserted through said apertures.

The inner wall of the element D is exposed to the pressure of the atmosphere at all times, ports K' being formed in the member K for that purpose.

The valve mechanism shown in Fig. 1 is well adapted for various purposes. For example, it is well adapted for use as disclosed in the prior application, Serial No. 473,439, filed May 28, 1921, of which this application is a division, to regulate the air content of the condenser of an internal combustion engine cooling system of the boiling and condensing type in response to the temperature of the steam passing from the cooling space of the engine to the condenser in which the steam is condensed. For such use the casing G may be incorporated in, and form a section of the conduit through which steam passes from the engine cooling jacket to the condenser, and the casing of the valve A is connected between pipe sections A² and A³ of a conduit connecting the air outlet of the condenser to a vacuum pump or other air exhausting device. In such case, as the temperature of the steam in contact with the outer surface of the container C increases and diminishes, the valve B moves toward and away from its seat to throttle or increase the flow of atmospheric air through the port A' into the air exhausting line from the condenser. The admission of air through this line tends to reduce the vacuum in, and the condensing capacity of the condenser, and thereby tends to increase the temperature in the cooling system.

As already stated, however, the valve mechanism shown in Fig. 1, is capable of other uses than the one just metioned, and is characterized by its compactness, its mechanical simplicity, and its reliability in operation. The valve mechanism may be easily inserted and removed from its seat in the wall of the conduit or casing containing the fluid to the temperature of which the mechanism is responsive. The thermostatic element and valve are protected from injurious contact with external objects, and are accurately guided in their movements. The manner in which the valve is connected to the thermostatic element not only provides mechanical simplicity and compactness, but insures a minimum of frictional resistance to the valve motion and avoids all possibility of lost motion.

The modified form of valve mechanism shown in Fig. 2 differs from that shown in Fig. 1 in the provisions made for utilizing an increase in the temperature to which the container C is subjected to open the port a' of the valve casing a. To this end an internal valve member b is provided in the casing a, with a spring b' acting on the valve member b in a direction to seat the latter and close the port a'. An axial extension b² of the valve member b extends through the port a' into engagement with the free end of the stem B' of the thermostatic mechanism proper. The valve mechanism shown in Fig. 2 may be used in various ways. For example, as disclosed in said prior application, the casing G may form a part of the conduit through which steam passes from an engine jacket to a condenser to which air is supplied under pressure, and in which a pressure above that of the atmosphere is maintained. The thermostatic mechanism of Fig. 2 opens the vent port a' and permits the escape of air from the condenser when the temperature in the system becomes too high and closes when the temperature in the system falls.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described the invention, what I claim as new and desire to secure by Letters Patent, is:

1. In a thermostatic valve mechanism adapted to control the flow through a conduit in response to the temperature of another fluid containing space, the combination with a structure including a cup-shaped casing adapted to be secured to and to close an aperture in the wall of said space with the closed end of said casing located within said space, a cup-shaped bellows element located within said casing, and attached at its rim to the latter with its closed end forming the movable wall of an expansible fluid containing space between said casing and element, a valve casing attached to said structure and adapted to be connected into the first mentioned conduit and having a port co-axial with said bellows, and a valve member controlling said port and actuated by the movable end of said bellows element, said structure and valve casing being arranged to be inserted in and withdrawn from said aperture in the wall of said space as a unit.

2. In a thermostatic valve mechanism adapted to control the flow through a conduit in response to the temperature of another fluid containing space, the combination with a structure including a cup-shaped casing adapted to be secured to and to close an aperture in the wall of said space with the closed end of said casing located within said space, a cup-shaped bellows element located within said casing and attached at its rim to the latter with its closed end forming the movable wall of an expansible fluid containing space between said casing and element, a valve casing adapted to be connected into the first mentioned conduit and having a port co-axial with said bellows, a valve member controlling said port and actuated by the movable end of said bellows element, and a member mechanically connecting said casing and structure and formed with an opening through which said port communicates with the external atmosphere, said structure and valve casing being arranged to be inserted in and withdrawn from said aperture in the wall of said space as a unit.

3. In a thermostatic valve mechanism adapted to control the flow through a conduit in response to the temperature of another fluid containing space, the combination with a structure including a cup-shaped casing adapted to be secured to and to close an aperture in the wall of said space with the closed end of said casing located within said space, a cup-shaped bellows element located within said casing and attached at its rim to the latter with its closed end forming the movable wall of an expansible fluid containing space between said casing and element, a valve casing attached to said structure and adapted to be connected into the first mentioned conduit and having a port co-axial with said bellows, and a valve member controlling said port, a valve actuating stem connected to the movable end of said bellows element, a member axially disposed in said element and in threaded engagement with said structure, forming a guide for said stem and an adjustable spring abutment, and a spring acting between the last mentioned member and the closed end of said bellows element.

Signed at Bellport, in the county of Suffolk and State of New York, this 11th day of November, A. D. 1925.

SUE R. MALLORY,
*Administratrix of the Estate of Harry C. Mallory, Deceased.*